United States Patent
Webster

[15] 3,682,939
[45] Aug. 8, 1972

[54] PREPARATION OF QUATERNARY POLYVINYL PYRIDINE POLYMERS IN WATER

[72] Inventor: William E. Webster, "Menai," Station Road, Gnosall, Stafford, England

[22] Filed: June 30, 1969

[21] Appl. No.: 837,868

[30] Foreign Application Priority Data

July 18, 1968 Great Britain..........34,285/68

[52] U.S. Cl. ......260/294.8 R, 260/88.3, 260/79.3 M
[51] Int. Cl. ...........................................C07d 31/48
[58] Field of Search...................................260/294.8

[56] References Cited

UNITED STATES PATENTS 2,484,420 10/1949 Minsk et al.............260/294.8
2,484,430 10/1949 Sprague et al..........260/294.8

*Primary Examiner*—Alan L. Rotman
*Attorney*—Sughrue, Rothwell, Mion, Zinn & Macpeak

[57] ABSTRACT

A process in which a quaternary vinyl pyridine salt may be produced and then polymerized directly without the need for any isolation stage is disclosed. The process involves the replacement of the conventional non-aqueous solvent for the reaction by water; the vinyl pyridine and water are mixed, a quaternizing agent is added to the mixture and the mixture heated to form a solution of the quaternary vinyl pyridine salt. The solution so produced is then directly amenable to polymerization without the necessity for isolation and purification of the salt.

6 Claims, No Drawings

PREPARATION OF QUATERNARY POLYVINYL PYRIDINE POLYMERS IN WATER

There are basically two processes for the preparation of quaternary poly(vinyl pyridine) salts from vinyl pyridines; either vinyl pyridine is polymerized and the polymer then quaternized, or a vinyl pyridine itself is quaternized and the quaternary salt then polymerized. Of these two processes, the latter is the more recent, and has certain advantages. One way of carrying out the latter process is described in U.S. Pat. No 2,811,510 in which 2-methyl-5-vinyl pyridine and a dialkyl sulphate are reacted together in acetone at low temperature whereupon the quaternary vinyl pyridine salt is precipitated as a white crystalline solid. This salt as precipitated contains impurities, and is recrystallized from ethanol, and then dissolved in water and polymerized at 60°C, using a peroxide initiator in such concentrations as to promote free radical polymerization. The viscous solution resulting is diluted with an equal volume of methanol, and poured into acetone when the quaternary poly (vinyl pyridine) salt is precipitated.

One problem with the above described process is the need to isolate the crystalline quaternary salt prior to polymerization. Further the crystallization process can only be applied to vinyl pyridines having a methyl group adjacent to the heterocyclic nitrogen atom. The corresponding crystalline salts of vinyl pyridine monomers such as 2-vinyl pyridine, 4-vinyl pyridine and 5-ethyl-2-vinyl pyridine cannot be formed in the manner described.

There has thus been a need for a process in which a quaternary vinyl pyridine salt may be produced and then polymerized directly without the need for any isolation stage. It is clearly desirable that any process developed should be applicable to vinyl pyridines irrespective of whether a methyl group is present in the position adjacent to the heterocyclic nitrogen atom.

This has been achieved by replacing the conventional non-aqueous solvent for the reaction by water. Thus, according to the invention, I mix a vinyl pyridine and water, add a quaternizing agent to the mixture and heat to form a solution of the quaternary vinyl pyridine salt. The solution so produced is then directly amenable to polymerization without the necessity for isolation and purification of the salt.

Various quaternizing agents may be used, but the preferred agent is a dialkyl sulphate, the simplest example of which is dimethyl sulphate, and the invention will be further described primarily with reference to dimethyl sulphate although other agents such as diethyl sulphate can be used equally well. It is surprising that the process according to the invention can be carried out using dialkyl sulphates such as dimethyl sulphate. Dimethyl sulphate, for example, is stated in the literature to be hydrolyzed by water at or above 18°C, and therefore one would have expected that heating an aqueous mixture of a vinyl pyridine and dimethyl sulphate would result in a considerable quantity of the dimethyl sulphate undergoing hydrolysis; this is not so as may be seen from the yields of 95 percent or better of quaternary vinyl pyridine salt which can be obtained by heating to 70°C. The quantity of quaternizing agent required is nominally one molar proportion, referred to the vinyl pyridine. In practice however, purity factors of the reactants have to be taken into account and the precise quantity required is determined by analysis of a sample withdrawn from the reaction mixture at an appropriate time.

The polymerization of quaternary vinyl pyridine salts in aqueous solution has in recent years been studied in some detail, and it has been found that polymerization may occur by one of two mechanisms, a free-radical mechanism as described by Shyluk, "Poly(1,2-dimethyl-5-vinyl pyridinium methyl sulphate) I, polymerization studies," Journal of Polymer Science, Pt. A 2(5) 2191–2206 (1964), or a "spontaneous" polymerization mechanism, as described in "Spontaneous polymerization of 1,2 dimethyl 5-vinyl pyridinium methyl sulphate in an aqueous medium." Dokl Acad. Nauk; USSR, 168 (c) 1350–3 1966. There are essential differences between the two mechanisms of polymerization, however, as regards the necessary concentration of the quaternary pyridine salt, the level of initiation, and the temperature of polymerization. In free radical polymerization, complete conversion of quaternary pyridine salt to polymer can be made to occur at almost any temperature and at almost any concentration of the salt, the rate of polymerization increasing with increase of temperature, and the level of initiation necessary being inversely related to the salt concentration. At low concentrations, for example 10–25 percent of salt, as much as 5 percent of initiator may be necessary while at higher concentrations, such as 50–90 percent of salt, the amount of initiator required may be reduced by a factor between 10 and a hundred. For spontaneous polymerization to occur, the concentration of the salt must be very close to its maximum solubility, and high conversions of salt to polymer are only obtained if the temperature is kept at or below about 30°C; above this temperature; at best 60 percent conversions can be obtained. Considerably less initiator is required than in free radical polymerization, and up to 1,000 p.p.m. of initiator, or mere exposure to air, will generally suffice.

Solutions of quaternary vinyl pyridine salts prepared according to the invention are very suitable for spontaneous polymerization, since they can be prepared in very concentrated form. There is no need to purify the quaternary salt before polymerization; such hydrolysis products of the dialkyl sulphate as are produced, and free sulphur dioxide, (which may frequently be present in commercial dialkyl sulphate), do not inhibit the subsequent polymerization. The quantity of water in the initial reaction is determined by the concentration of monomer quaternary salt required. This concentration is governed by two factors:

a. The minimum monomer quaternary concentration for the polymerization to occur in the manner required, and
b. desirability of the formation of the polymer in a hard, brittle and therefore easily handleable form, or in the case of "rubbery" polymers eg. using 2-methyl 5-vinyl pyridine, as a tough "elastic" material. For example, if 1 mole 2-vinyl 5-ethyl pyridine and 1.05 mole water are heated to 70°C and quaternized by adding 1 mole dimethyl sulphate, the resulting monomer quaternary salt solution contains 95 percent monomer salts and 5 percent water. At this concentration, polymerization occurs on adding 100 ppm ammonium persulphate and a hard brittle polymer is formed.

One important aspect of our invention, however, is that we have found that there is a critical concentration of free vinyl pyridine in the quaternary salt solution(expressed hereafter as a percentage of the vinyl pyridine taken initially and not as a percentage of the total solution)above which spontaneous polymerization will not occur to any appreciable extent. For example, in the case of 2-vinyl pyridine, polymerization is seriously retarded if there is more than 0.5 percent of free 2-vinyl pyridine present in the quaternary salt solution. If all the other conditions are suitable for polymerization, that is the say the temperature and the concentrations of salt and initiator, and yet polymerization does not take place satisfactorily, then it may be assumed that there is too much free vinyl pyridine present. A sample of the solution must therefore be tested at this stage, for example by standard ultra-violet spectrographic techniques or by titration, and if the content of free vinyl pyridine is above that which experience has shown to be the critical level, then small further amounts of quaternizing agent must be added. A typical solution contains the quaternary salt, together with free vinyl pyridine and vinyl pyridine present as simple salt formed by the reaction of vinyl pyridine and acids produced by any small amount of hydrolysis of dialkyl sulphate that has occurred. One method of testing is as follows: A sample of the solution is diluted with water and extracted with benzene. The benzene layer which contains any free vinyl pyridine is titrated against 0.1N acetous perchloride acid to the grey-green end point using crystal violet indicator. The raffinate is then basified to liberate the vinyl pyridine present as simple salt and extracted again with benzene and titrated as before. From the quantity of vinyl pyridine taken at the start of the preparation, the concentration of free vinyl pyridine and of vinyl pyridine as simple salt, the concentration of quaternized salt can be calculated. Additional dialkyl sulphate is added according to the free vinyl pyridine found by the first titration.

The solution is then cooled and a small proportion of initiator added so that spontaneous polymerization occurs; the temperature at which polymerization takes place should preferably be between 20° and 30°C, and any increase in temperature will result in a fall in the conversion. Quaternary poly(vinyl pyridine) salt is obtained as a brittle solid or stiff rubber depending on the particular vinyl pyridine being used.

The invention is applicable primarily to the formation of quaternary salts (and thereafter of polymers) from a vinyl pyridine itself or from mono- or dialkyl vinyl pyridines, such as ethyl or methyl vinyl pyridines. The vinyl group may be in the 2, 3 or 4-position on the pyridine ring, but the process does not give such outstandingly good results when the vinyl group is in the 4-position. Specific examples of the vinyl pyridines which may be used are 2-, 3-, or 4-vinyl pyridine,
2-vinyl, 5-ethyl pyridine,
2-methyl 5-vinyl pyridine, 2-vinyl 4-methyl pyridine,
2-methyl 6-vinyl pyridine, 2-methyl 4-vinyl pyridine,
2-vinyl 5-methyl pyridine,
3-vinyl 5-ethyl pyridine,
2-vinyl 4,6 dimethyl pyridine,
4-vinyl 2,6 dimethyl pyridine,
2-isopropenyl pyridine, and
4-isopropenyl pyridine,
the process being particularly effective for
2-vinyl pyridine,
2-methyl 5-vinyl pyridine and
2-vinyl 5-ethyl pyridine The preferred temperature for the quaternization is from 50° to 90°C although the reaction can be carried out less successfully outside this range. The optimum temperature for the quaternization is about 70°C and a typical conversion at this temperature is 95 percent.

As stated, for spontaneous polymerization, the concentration of the quaternary vinyl pyridine salt in solution must be close to its maximum solubility. In practice this means that the concentration must be, for example, at least 75 percent in the case of 2-methyl-5-vinyl pyridine-dimethyl sulphate salt, at least 90 percent in the case of 2-vinyl pyridine-dimethyl sulphate salt and at least 95 percent in the case of 2-vinyl 5-ethyl pyridine-dimethyl sulphate-salt. As stated previously, spontaneous polymerization may be induced by mere exposure of the quaternary salt solution to air but in practice this is not a satisfactory procedure since precise control of the level of initiation produced is not possible. In practice very small concentrations of initiator are added, the amount being determined by the particular vinyl pyridine involved. Ammonium or other persulphates are the preferred initiators, and then we prefer to use about 25 p.p.m. for 2-vinyl pyridine, from 100 to 150 p.p.m. for 2-methyl-5-vinyl pyridine, and from 25 to 75 p.p.m. for 5-ethyl 2-vinyl pyridine.

Concentrations of initiator in excess of these levels can result in dangerous "runaway" polymerizations where the temperature increase cannot be controlled, unless the plant is so designed that it has a suitable reserve of cooling capacity to meet such eventualities.

Other suitable initiators include organic peroxides and AZDN, (N,N' azodiisobutyronitrile).

Some examples will now be given:

EXAMPLE 1

1 mole (126 g) of dimethyl sulphate was slowly added to an aqueous solution of 1 mole (119g) of 2-methyl-5-vinyl pyridine and 82 g of water. The reaction was exothermic, and the temperature was controlled at 60°C by the rate of addition of the dimethyl sulphate; the reaction was completed in 30 minutes.

The solution was cooled to 20°C, and 150 p.p.m. of ammonium persulphate added. Polymerization proceeded rapidly, and a tough rubbery gel of poly (1,2-dimethyl-5-vinyl pyridinium methosulphate) in 93 percent yield was obtained in 3 hours.

EXAMPLE 2

1 mole (126 g) of dimethyl sulphate was slowly added to an aqueous solution of 1 mole (133 g) of 5-ethyl-2-vinyl pyridine and 5g of water. The procedure of example 1 was followed, and a 97 percent yield of poly (1-methyl-5-ethyl-2-vinyl pyridium methosulphate) obtained as a brittle polymer.

EXAMPLE 3

1 mole of 5-ethyl-2-vinyl pyridine and 1.05 mole of water were mixed and heated to 70°C. 1 mole diethyl sulphate was added stepwise, maintaining the temperature between 65°C and 75°C. The resulting solution contained nominally 95 percent monomer salt and after cooling to 25°C and adding 100 ppm ammonium persulphate, a hard brittle polymer was formed during 3–4 hours.

EXAMPLE 4

Into a 7 gallon reactor fitted with a 5 inch turbine agitator and baffle was charged 15.75 lb of 2-vinyl pyridine and 1.85 lb water. The temperature was raised to 65°C and 19.3 lb of dimethyl sulphate were added in small aliquots, the temperature being maintained at 70° ± 5°C by supplying cooling water as required to a jacket surrounding the reactor. The quaternization stage was completed in 50 minutes.

The batch was analyzed for free 2-vinyl pyridine at this point and sufficient dimethyl sulphate added to reduce the level of free 2-vinyl pyridine to below 0.4 percent. The mixture was then cooled with stirring to room temperature, 15.8 ml of 5 percent w/w aqueous ammonium persulphate solution were added and the mixture stirred for 2 minutes. The initiated batch was then placed in polyethylene-lined, water cooled, metal trays for polymerization, the temperature during the polymerization process being maintained at 25° ± 5°C.

The conversion to polymer was 80 percent within 3 hours and poly (1-methyl-2-vinyl pyridinium methosulphate) was obtained as a brittle solid. Quaternary poly(vinyl pyridine) salts are useful as flocculants for anionic suspensions including clays, shales, coal fines, sewage sludges and colloids such as humic acids. One important application is in their use as conditioning agents to aid the de-watering of sewage sludges and similar concentrates, and further applications include their use as antistatic agents, mordants for acid dyes, adhesion aids, surface conditioning agents, and in the formation of complexes with acidic polymers. The solid or "rubbery" polymers are generally used in aqueous solution. For example, a 1 percent solution may be added to sewage sludge and the resulting flocculated solids are easily dewatered. The polymers are used similarly in flocculating suspended fines in coal wash waters, clay slurries and so on.

When used for example as an adhesion aid or size, again the polymer is applied to a substrate by adsorption from an aqueous solution.

I claim:

1. A process for the preparation of a quaternary vinyl pyridine salt in which a vinyl pyridine is mixed with water, a quaternizing agent is added to the mixture and the mixture heated to form a solution of the quaternary vinyl pyridine salt.

2. A process according to claim 1 in which the quaternizing agent is a dialkyl sulphate.

3. A process according to claim 2 in which the quaternizing agent is dimethyl sulphate.

4. A process according to claim 2 in which the quaternization temperature is from about 50° to about 90°C.

5. A process according to claim 4 in which the quaternization temperature is about 70°C.

6. A process according to claim 4 in which the vinyl pyridine is 2-methyl-5-vinyl pyridine, 2-vinyl pyridine or 5-ethyl-2-vinyl pyridine.

* * * * *

UNITED STATES PATENT OFFICE
CERTIFICATE OF CORRECTION

Patent No. 3,682,939             Dated  August 8, 1972

Inventor(s)  William E Webster

It is certified that error appears in the above-identified patent and that said Letters Patent are hereby corrected as shown below:

In The Heading:

The name of the Assignee was omitted. Should read:

--Assignee: Midland-Yorkshire Tar Distillers Ltd.,

Birmingham, England--

Signed and sealed this 6th day of March 1973.

(SEAL)
Attest:

EDWARD M. FLETCHER, JR.                ROBERT GOTTSCHALK
Attesting Officer                       Commissioner of Patents